United States Patent [19]

Waldner

[11] Patent Number: 5,626,260
[45] Date of Patent: May 6, 1997

[54] DRY COMPOSITION DISPENSER

[76] Inventor: David J. Waldner, R.R. 2 Box 48, Elkton, S. Dak. 57026

[21] Appl. No.: 269,833

[22] Filed: Jul. 1, 1994

[51] Int. Cl.$^6$ .................................................. B67D 5/60
[52] U.S. Cl. ........................ 222/144; 222/144.5; 279/106
[58] Field of Search ........................ 222/1, 144, 144.5, 222/168.5, 367, 368, 370, 410, 411, 452; 901/39; 285/18, 322; 279/35, 4.04, 106

[56] References Cited

U.S. PATENT DOCUMENTS

| | | | |
|---|---|---|---|
| 3,820,688 | 6/1974 | Weiste | 222/411 |
| 4,020,980 | 5/1977 | Illes, Jr. | 222/411 |
| 4,130,225 | 12/1978 | Illes, Jr. | 222/411 |
| 4,166,581 | 9/1979 | Hetrick | 239/683 |
| 4,167,248 | 9/1979 | Akazawa et al. | 239/683 |
| 4,258,759 | 3/1981 | Achen | 222/144 |
| 4,609,153 | 9/1986 | van der Lely | 239/665 |
| 4,790,708 | 12/1988 | van Bennigsen-Mackiewicz et al. | 285/322 |
| 4,836,456 | 6/1989 | van der Lely | 239/682 |
| 5,018,669 | 5/1991 | van der Lely et al. | 239/665 |
| 5,065,905 | 11/1991 | Eddy et al. | 222/368 |
| 5,078,302 | 1/1992 | Hellenberg | 222/144 |
| 5,119,973 | 6/1992 | Miller et al. | 222/144 |

*Primary Examiner*—Andres Kashnikow
*Assistant Examiner*—Philippe Derakshani

[57] ABSTRACT

A dry composition dispenser for dispensing powdered or granular materials comprising a frame, a support surface rotatably secured to the frame, a rotator for selectively rotating the support surface, a plurality of bins secured to the support surface in which each bin may contain a different powdered or granular material, a metering assembly residing in each bin, and a metering motor which when engaged with a metering assembly in a bin containing material to be dispensed, may be operated to dispense material from the selected bin.

28 Claims, 3 Drawing Sheets

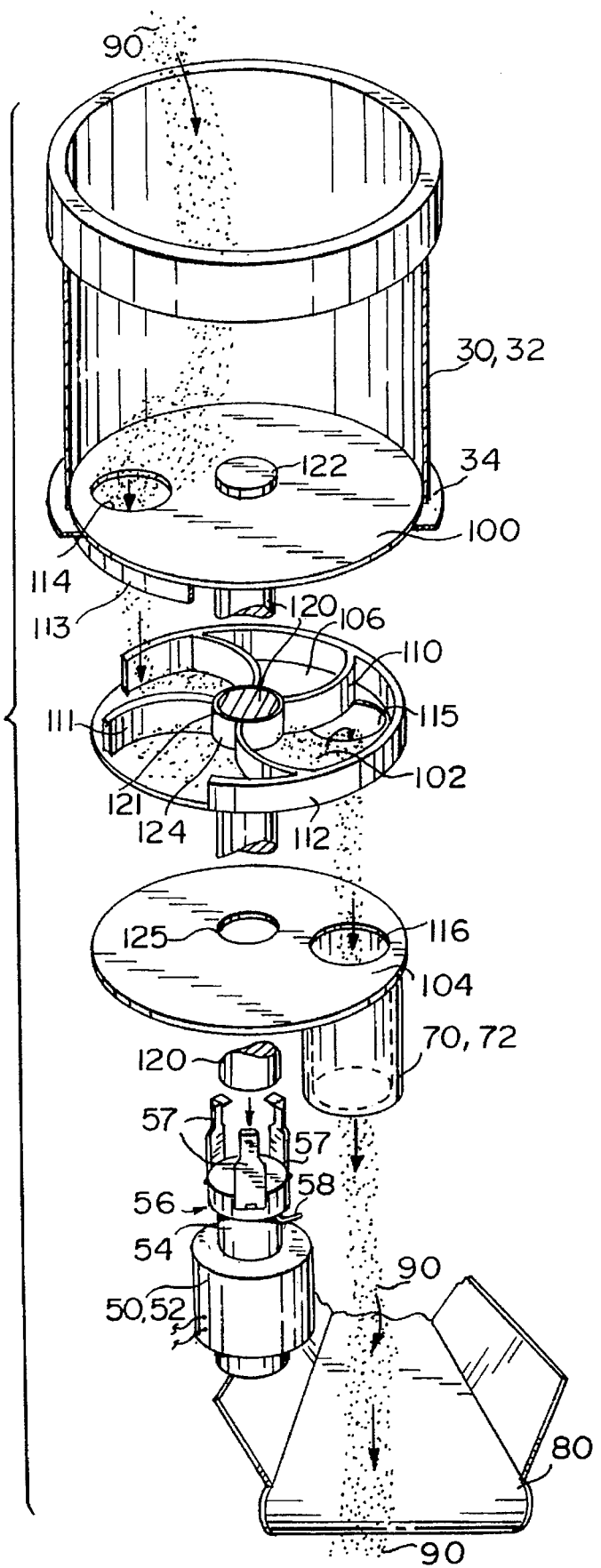

DRY COMPOSITION DISPENSER

BACKGROUND OF THE INVENTION

The present invention relates to a dry composition dispenser for dispensing flowable materials, and in particular powdered or granular materials. A variety of industries utilize processes requiring dispensing of dry granular or powdered materials. These industries include agricultural mill houses where animal feeds are prepared by blending various ground seeds and grain; pharmaceutical and drug applications where medicament compositions are prepared by combining two or more dry granular or powdered materials; food processing operations where food compositions or intermediate compositions are prepared by mixing various dry granular materials; and general industrial processing involving processing and preparation of dry granular industrial products such as powdered building materials including cement, plaster, dry adhesives, and other related materials.

Although dry composition dispensers are known in the art, such dispensers are relatively complex, bulk, expensive, and often require significant maintenance. For example, currently known dispensing apparatuses for dispensing four different types of materials utilize an individual motor for dispensing each type of material from its corresponding bin or container. In apparatuses utilizing a number of dispensing motors less than the number of material bins, complex and intricate gearing is required to couple the selected motor to the desired material bin for dispensing material from that bin. Thus, a need exists for a dispensing apparatus which avoids the relatively costly, cumbersome, and high maintenance requirements of prior art dispensers.

When dispensing multiple materials, it becomes increasingly difficult to efficiently do such as the number of materials increases due to the requisite hardware and dispensing equipment necessary for performing such. In a case of dispensing ten different dry powdered materials in different proportions in order to form a single dry mix, a formulator would have to dispense each material from its material bin source in the desired amount and then transport each discharged amount, typically by conveyer, to the mixing site. The use of ten different conveyers is clearly undesirable in view of the high cost and maintenance of such conveying equipment. If less than ten conveyors are utilized, there then exists the added concern of coordinating the dispensing of material onto one or more common conveyors so that overspill does not occur. Alternatively, a formulator could transport a collection container from one bin to another and dispense desired amounts of material into the collection container until the final composition was collected in the container and such was ready for mixing. However, that procedure is undesirable as it involves transporting the collection container to ten different bins making sure that no loss of discharged material occurs. Thus, there is a need for a simple and cost effective apparatus and method for dispensing a plurality of dry materials to a single site, thereby avoiding the need for transporting the dispensed materials or transporting a collection container.

SUMMARY OF THE INVENTION

The present invention relates to a rotatable assembly comprising a collection of storage bins for dispensing material from at least one bin of the assembly to a desired location. The assembly comprises a frame, a rotatable support surface having a plurality of bins, a dispensing apparatus for dispensing material in a bin, and a rotator for rotating a bin on the support surface to a desired location for dispensing of material. More specifically, the present invention provides a dry composition dispenser for dispensing powdered or granular materials. The dispenser comprises a rotatable support surface upon which are mounted a plurality of bins for containing the powdered or granular materials. Each bin utilizes a metering assembly, which when coupled to a metering assembly activator, accurately dispenses material from the bin. By appropriate selection and coupling of bin and metering assembly activator, a series of materials may be selectively dispensed in varying amounts. The present invention also provides related methods for dispensing powdered or granular materials from the above described apparatuses.

BRIEF DESCRIPTION OF THE DRAWINGS

FIG. 3 is an exploded view of a bin, metering assembly, coupler, and a portion of the metering assembly activator, which when engaged with the metering assembly and coupler, and operated, dispenses material from the bin;

DESCRIPTION OF THE PREFERRED EMBODIMENT

Figure 1:
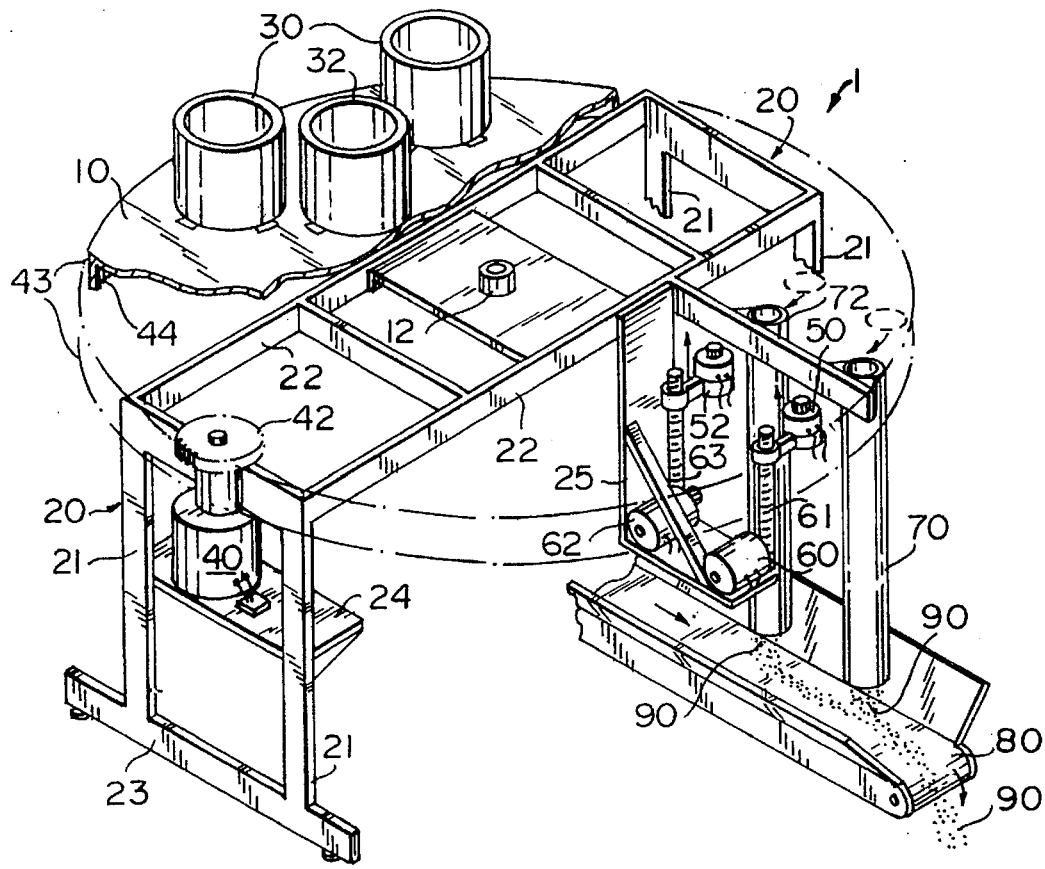
FIG. 1 is perspective view of the preferred dispenser embodiment in which a majority of an upper support surface of the dispenser is cut away to reveal the operative components of the dispenser.

FIG. 1 illustrates a dry composition dispenser 1 of the preferred embodiment. Dispenser 1 comprises a support surface 10 which is rotatable by means of a support surface bearing 12 secured to a dispenser frame 20. Support surface 10 is generally positioned over frame 20 and has an axis of rotation generally vertical and perpendicular to support surface 10 and through bearing 12. Frame 20 comprises one or more vertical support members 21, one or more horizontal support members 22, and one or more base members 23. Support surface 10 has a circumferential wall 43 along its perimeter extending downward from support surface 10 a distance sufficient to provide a drive wheel raceway 44 formed on an outward or inward facing surface. Support surface 10 is selectively rotated by a rotator such as selector motor 40 coupled to a drive wheel 42, which contacts drive wheel raceway 44. Although raceway 44 is preferably formed on the inward facing surface of wall 43, it is envisioned that wall 43 could be eliminated and raceway 44 be disposed on either an upper or lower surface of support surface 10. Friction between rotating drive wheel 42 and raceway 44 causes support surface 10 to rotate about its axis of rotation at bearing 12. Secured to support surface 10 are a plurality of bins 30 and 32 adapted for containing and dispensing one or more granular or powdered materials. Selector motor 40 is secured to frame 20 by a selector motor mount 24 affixed to one or more members. Associated with at least one bin is a dispensing apparatus for dispensing material from the bin. The dispensing apparatus generally comprises a metering assembly for the bin from which material is to be dispensed, and a metering assembly activator, both of which are described in greater detail below.

In the preferred embodiment, bins 30 and 32 are generally arranged in two concentric rings of bins—an outer ring of bins 30 and an inner ring of bins 32. Servicing the outer ring of bins 30 is an outer metering assembly activator comprising an outer metering motor 50, an outer actuator motor 60, and an outer actuator drive 61. Similarly, serving the inner ring of bins 32 is an inner metering assembly activator comprising an inner metering motor 52, an inner actuator motor 62, and an inner actuator drive 63. Actuator motors 60 and 62 are secured to frame 20 by a mount 25 which is affixed to one or more support members. Located underneath support surface 10 are an outer discharge tube 70 and an inner discharge tube 72. As explained in greater detail below, tube 70 and metering motor 50 are secured to linear actuator 61 so that when actuator motor 60 operates linear actuator 61, tube 70 and motor 50 are moved into position to interface with the selected bin and dispense material contained therein. Similarly, tube 72 and metering motor 52 are secured to linear actuator 63 so that when actuator motor 62 operates linear actuator 63, tube 72 and motor 52 are moved into position to interface with the selected bin and dispense material contained therein. Outer discharge tube 70 directs the flow of material dispensed from a selected bin among the outer ring of bins 30. Inner discharge tube 72 directs material dispensed from one of bins 32 of the inner ring. The material 90 directed from either discharge tube 70 or 72 passes to conveyor 80 where it is transported to desired locations in the plant or facility.

Figure 2:
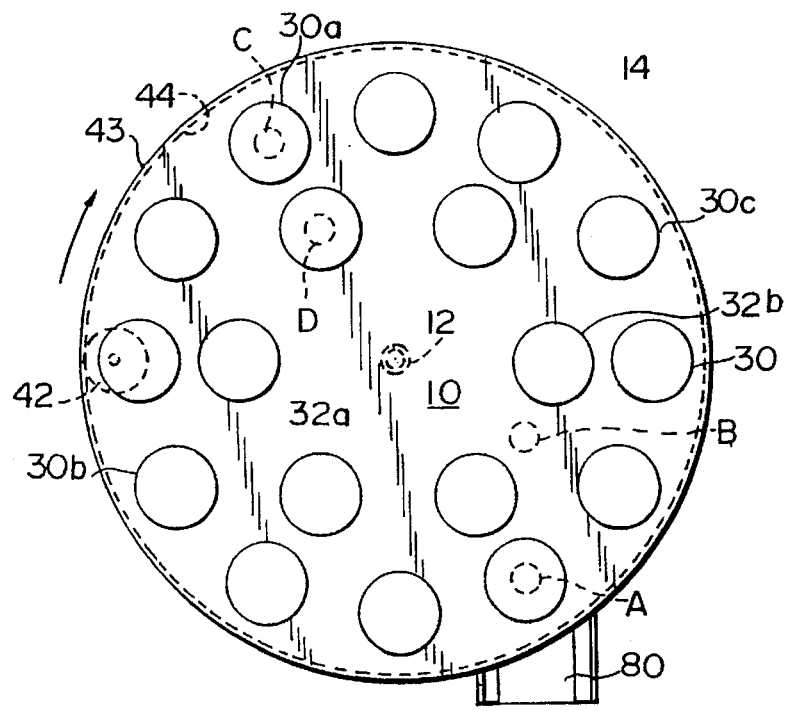
FIG. 2 is a plan view of the support surface of the preferred dispenser embodiment.

Referring to FIG. 2, dispenser 1 is depicted illustrating support surface bin openings 14 formed in support surface 10. That is, for each bin 30 or 32 there is a bin opening 14 for accommodating a bin. Each bin is releasably secured in a respective opening 14 by a locking means, which preferably allows the bin to be removed from support surface 10. Preferably, each bin has one or more ledges 34 (as shown in FIG. 3) generally extending outward from the bin outer surface which may either rest on the top of support surface 10 or assist in engaging or locking the bin to support surface 10. The number of bins 30 forming the outer ring, or bins 32 forming the inner ring, may be varied depending upon the end use requirements of the dry composition dispenser 1. It is preferred to arrange the bins in an equally spaced, or generally uniform arrangement, however it is envisioned that numerous arrangements are possible instead of concentric rings illustrated in FIG. 2.

FIG. 3 is an exploded view of a metering assembly provided for each bin 30 and 32. Each metering assembly is selectively engaged with and driven by one of the metering assembly activators previously described. Forming the bottom surface of each bin is a bin bottom plate 100 which provides an input port 114 for material to flow through upon dispensing such material. Disposed beneath plate 100 are an impeller base plate 102 having an impeller output port 115 formed in it, and an engagement face plate 104 which provides a dispenser output port 116. Ports 115 and 116 are aligned and are provided for dispensed material to flow through. Disposed between bottom plate 100 and base plate 102 is an impeller 110 comprising a plurality of vanes 111. Circumferential guide walls 112 and 113 provide a sealing surface for engagement with impeller vanes 111 as impeller 110 rotates. Bottom plate 100, base plate 102, and guide walls 112 and 113 form a generally cylindrical impeller chamber 106 within which impeller 110 resides. It is preferred that input port 114 is disposed on an opposite side of chamber 106 from ports 115 and 116 so that when impeller 110 is not rotated, flow of material from port 114, through chamber 106, to ports 115 and 116 is blocked by impeller 110 and veins 111.

Impeller 110 rotates within chamber 106 by means of a metering shaft 120 which extends at least partially into chamber 106. Impeller 110 is affixed to shaft 120 by key 121 and thus rotates within chamber 106 as shaft 120 is rotated. An end bearing 122 provided in bottom plate 100 rotatably secures shaft 120. Shaft 120 is rotated by either an outer metering motor 50 or an inner metering motor 52 located below the bin and metering assembly. Metering motors 50 and 52 are releasably engaged with metering shaft 120 by a releasable coupler such as metering coupler 56 affixed to a metering motor output shaft 54. Base plate shaft seal 124 and face plate shaft seal 125 provide a seal around rotatable shaft 120 to prevent seepage or flow of material out of chamber 106 or of contaminants into chamber 106.

Referring further to FIG. 3, granular or powdered material 90 stored or contained in either bin 30 or 32 is dispensed from its bin upon rotation of metering shaft 120 and impeller 110 as follows. Material 90 flows through input port 114 into impeller chamber 106 upon rotation of impeller 110. As vanes 111 guide the material from one side of chamber 106 to the area above output port 115, material flows through port 115 and port 116. Dispensed material exits the dispenser through one of discharge tubes 70 or 72. Dispensed material 90 may be gravity fed to a conveyor 80 for transport to other locations or operations.

Any one of bins 30 forming the outer ring may be coupled to outer metering motor 50 by rotation of support surface 10 so that the desired bin is directly above motor 50 for subsequent engagement therewith. Similarly, any one of bins 32 forming the inner ring may be coupled to inner metering motor 52 by rotation of support surface 10 so that the selected bin is in proper placement above motor 52 for subsequent engagement therewith. In the case of selecting a bin 30 along the outer ring the coupling between motor and metering assembly occurs as follows. Once the selected bin is in proper placement directly above metering motor 50 by selectively rotating support surface 10, outer actuator motor 60 is activated which drives linear actuator 61. As actuator 61 is driven by motor 60, metering motor 50, coupler 56 and discharge tube 70 are moved and positioned toward the underside of support surface 10 until the receiving end of coupler 56 is in position to engage with shaft 120. Once proper positioning and/or engagement has been made, actuator motor 60 is deactivated. Upon operation of metering motor 50, coupler 56 and shaft 120 rotate to thereby drive impeller 110 and dispense material 90 from the selected bin.

Figure 4A:
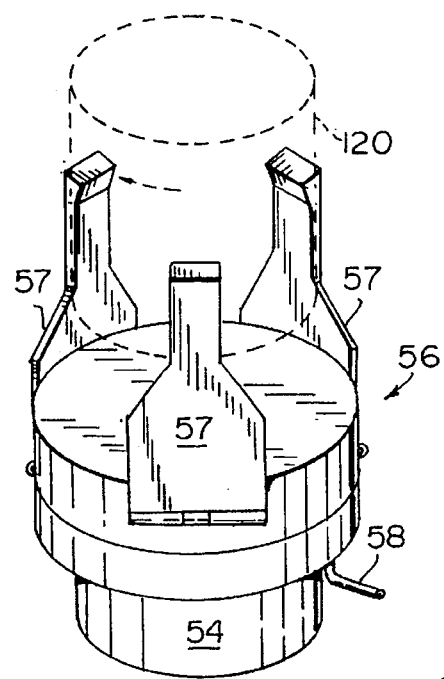
FIG. 4A is a perspective view of the coupler illustrated in FIG. 3 in a closed position.
Figure 4B:
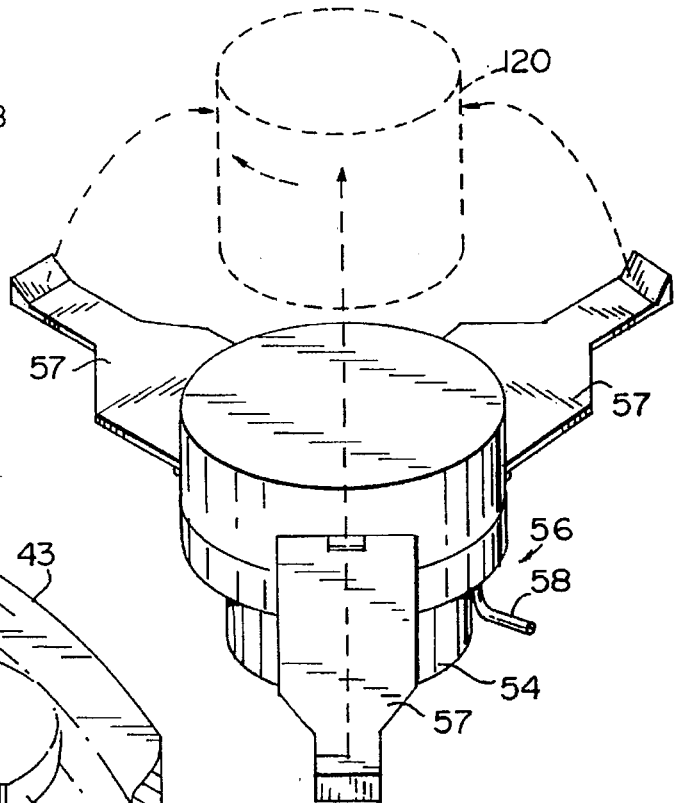
FIG. 4B is a perspective view of the coupler illustrated in FIG. 3 in an open position.

Metering coupler 56 is preferably a pneumatically operated, mechanical gripper as depicted in FIGS. 4A and 4B. FIGS. 4A and 4B illustrate the selective coupling between metering motor output shaft 54 and metering shaft 120 by closure of jaws 57. As illustrated, coupler 56 is a three jaw, pneumatically operated gripping assembly comprising jaws 57 which are moved from an open position (FIG. 4B) to a closed position (FIG. 4A) by introduction of pressurized air at air input 58. Coupler 56 can be configured to provide locking jaws 57 when placed in a closed position and/or upon loss of air signal at 58 or to fail in either an open or closed position. An example of a pneumatic gripper suitable for use as coupler 56 is VERSAGRIP II available from Robo-Tech Systems. It is envisaged that an electrical signal could be utilized in place of, or in addition to, the pneumatic signal to effect closure of jaws 57 and couple metering motor output shaft 54 to metering shaft 120.

In the preferred embodiment, metering motors 50 and 52 and actuator motors 60 and 62 are 1/10 hp, DC varispeed motors. The outputs of actuator motors 60 and 62 may be selectively reversed to disengage metering motors 50 and 52 from a metering assembly of a selected bin. Metering motors 50 and 52 are preferably driven through two-speed DC motor controllers. Preferably, selector motor 40 is a 1/10 to 1/3 hp, DC varispeed motor driven through a two-speed DC motor controller. It is envisioned that outputs from any of the metering, selector and actuator motors could be variable, and not limited to one, two or more speeds. It is also envisioned that the rotation of selector motor 40 may be selectively reversed to provide rotation of support surface 10 in both directions.

Figure 5:
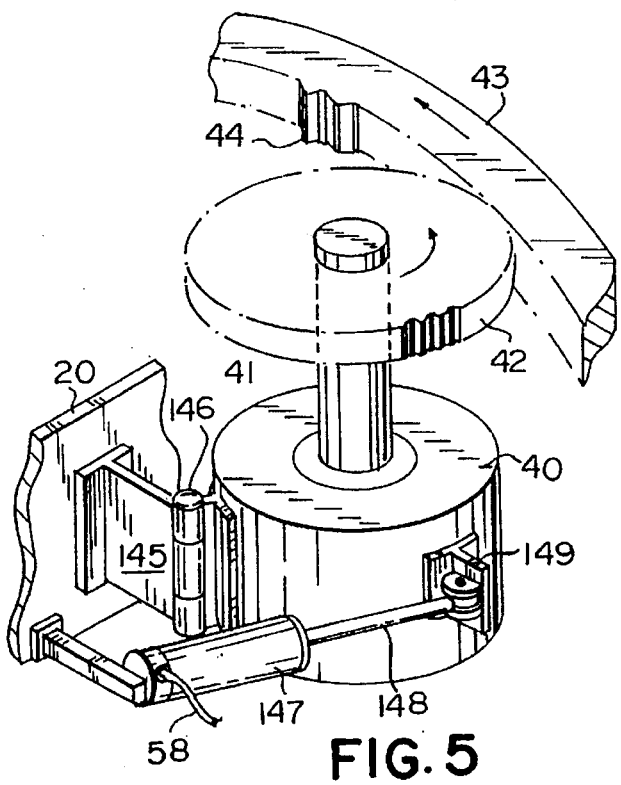
FIG. 5 is a perspective view of a preferred embodiment of a selector motor, a drive wheel, and a raceway of the dispenser support surface.

FIG. 5 illustrates a preferred embodiment of selector motor 40, affixment to dispenser frame 20, and engagement between drive wheel 42 and drive wheel raceway 44. In that preferred embodiment, motor 40 is affixed to frame 20 by a support member 145 and a hinged member 146 which allows motor 40, shaft 41, and drive wheel 42 to swing into position to rotate support surface 10. Alternatively, hinged member 146 enables movement of drive wheel 42 away from raceway 44. Contact between drive wheel 42 and raceway 44 is governed by arm 148 which is extended from air cylinder 147 upon introduction of a pressurized air source via input 58. Arm 148 is slidable within cylinder 148 and has an end secured to motor 40. Arm 148 is extended upon introduction of a pressurized air source to cylinder 147 by a moveable piston (not shown in FIG. 5) disposed within cylinder 147. Of course, other gas sources could be utilized instead of air, and if desired, hydraulic systems could be employed for positioning motor 40 and other components. The movement of motor 40 and drive wheel 42 about hinge 146 may be assisted or countered by one or more springs or other means as might be necessary (not shown). In addition, springs could be utilized to assist in maintaining contact between wheel 42 and raceway 44 if cylinder 147 and arm 148 are not capable of doing such, or if air pressure is inadequate. Alternatively, one or more springs could be employed so that upon loss of air pressure, motor 40 and wheel 42 would readily be swung away from raceway 44. A wide array of drive wheel 42 and raceway 44 configurations can be utilized including tooth and gear as partially depicted in FIG. 5.

A variety of materials may be utilized for forming dispenser 1 and its components. It is preferred to utilize a medium to heavy grade steel for dispenser frame 20, members 21, 22 and 23, and the related mounting components 24 and 25. Bins 30 and 32 and support surface 10 may be formed from metals such as aluminum or plastic including reinforced plastic. It is preferred that support surface 10 and bins 30 and 32 be formed from a strong lightweight durable plastic which is compatible and inert to the materials which will be dispensed. For applications involving dispensing of corrosive or abrasive materials it is preferred to utilize a liner or coating on the surfaces of bins 30 and 32 and other components of dispenser 1 which will contact the corrosive or abrasive material. The criteria for material selection for the dispenser components will also vary depending upon other end use requirements such as whether dispenser 1 will be employed in an industrial setting, or in a "food grade" or pharmaceutical setting. The size of bins 30 and 32 may range from a fraction of a gallon up to hundreds of gallons. A preferred range of bin volume is from about 20 gallons to about 50 gallons.

The dispensing capacity of the metering assembly serving each bin, and output speeds of the metering motors are such that a wide range of dispensing rates may be achieved. It is preferred to size the components of the metering assembly and utilize metering motor speeds such that dispensing rates of from about 5 lbs./min. to about 200 lbs./min are obtained. Most preferably, a dispensing rate of from about 30 lbs./min. to about 150 lbs./min. is utilized. In addition, the type of granular or powdered material which is to be dispensed may influence the geometry of impeller 110. Free flowing powders may be dispensed by an impeller having veins of less curvature than an impeller utilized for dispensing less readily flowable powders.

Referring to FIG. 2, the operation of dispenser 1 is as follows. In the event a formulator wishes to dispense one pound of material contained in bin 30a, two pounds of material in bin 30b, six pounds of material in bin 30c, four pounds of material in bin 32a, and one-half pound material in bin 32b, support surface 10 is rotated by operation of selector motor 40 and drive wheel 42 until bin 30a is in position A, directly above conveyor 80, outer metering motor 50, outer actuator motor 60, outer linear actuator 61 and outer discharge tube 70. Outer actuator assembly comprising actuator motor 60 and linear actuator 61, engages outer metering motor 50 with the metering assembly of bin 30a via coupler 56. Once engaged, outer metering motor 50 is activated to dispense one pound of material from bin 30a onto conveyor 80. After completing such dispensing, motor 50 is disengaged from the metering assembly of bin 30a. Support surface 10 is rotated until bin 30b is placed in proper position at location A. The process of engagement is repeated and two pounds of material in bin 30b is dispensed onto conveyor 80. Upon completion of dispensing and disengagement of motor 50 from the metering assembly of bin 30b, surface 10 is rotated until bin 30c is positioned at location A. The engagement process is repeated and outer metering motor 50 dispenses the desired six pounds of material onto conveyor 80. Next, bin 32a is placed at location B, directly above conveyor 80, inner metering motor 52, inner actuator motor 62, inner linear actuator 63, and inner discharge tube 72. Upon engagement of inner metering motor 52 with the metering assembly in bin 32a, via coupler 56, and activation of motor 52, four pounds of material are dispensed onto conveyor 80. Upon completion of dispensing and disengagement of motor 52 from the metering assembly of bin 32a, bin 32b is placed in proper location for engagement with inner metering motor 52. Likewise, one-half pound of material contained in bin 32b is dispensed onto conveyor 80.

The preferred embodiment and operation of dispenser 1 is particularly well suited for filling operations also. Referring further to FIG. 2, a material discharge chute (not shown) could be located at location C, thus serving to fill bins in the outer ring, and a second material chute (not shown) could be located at location D thereby serving the inner ring of bins. A typical filling process would involve rotating support surface 10 to position the appropriate bin into proper location at either location C or D. For instance, if it were desired to fill bins 32b and 30c with material, support surface 10 would be rotated until bin 32b was positioned under the discharge chute at location D and then filled. Bin 30c could likewise be positioned in its fill location at location C by rotation of support surface 10 and subsequently filled.

When dispensing (or filling) material from (or to) multiple bins, it is likely that the bins will not be adjacent to one another, and that the bins will be located at opposite regions of surface 10. Thus, when dispensing materials from multiple bins, after sufficient material has been dispensed from a bin, and another bin is to be selected, it is preferable to select the bin which is closest to the previously selected bin if the order of material dispensing is not important. This practice will result in shorter time periods between dispensing materials from different bins, and less wear on dispenser components, in particular selector motor 40, drive wheel 42, raceway 44, and bearing 12, which in turn result in lower operating and maintenance costs. This optimization practice may also be utilized in conjunction with a reversible selector motor 40 so that in determining which bin is the closest bin to the currently selected bin, bins on both sides of the currently selected bin may be considered. This optimization practice is readily implemented if the operation of dispenser 1 is controlled by a programmable controller. A preferred type of controller is an electronic programmable logic controller (typically referred to as a PLC in the industry) which may be configured to perform a variety of dispensing operations including various safety shutdown procedures and default modes. If selector motor 40 provides more than one output shaft speed, it is most preferred to utilize a relatively high speed when bringing the selected bin toward the desired location. As the bin nears the desired location; a lower speed may then be switched to. Preferably, if operation is controlled by a PLC, velocity control provisions may be utilized to achieve multistep acceleration or deceleration over predetermined distances.

It is preferred to utilize at least one signaling device that provides feedback to control the operation of selector motor 40, actuator motors 60 and 62, and metering motors 50 and 52. Feedback means for selector motor 40 and actuator motors 60 and 62 may be by any common means known, such as by activation of limit or position switches, indicating position of support surface 10 and/or linear actuators 61 and 63. Feedback means are preferably provided to selector motor 40 indicating the rotational position of the support surface which may activate, deactivate or otherwise effect operation of selector motor 40. Similarly, feedback means are preferably provided to one or both actuator motors 60 and 62 indicating the position of actuators 61 and 63, to activate, deactivate, or otherwise effect operation of one or both actuator motors 60 and 62. It is most preferred to provide feedback means for indicating the quantity, either by weight or by volume, of material dispensed from a bin by one or both metering motors 50 and 52. Such feedback means may activate, deactivate, or otherwise effect operation of metering motors 50 and 52. The form of feedback means for metering motors 50 and 52 generally depends upon whether dispenser 1 is manually controlled, automatic, or semi-automatically controlled. For manually controlled dispensers, the feedback may be visual indication that a sufficient quantity of material has been dispensed. An operator seeing such indication (e.g. from a scale or other sensor) would discontinue operation of the metering motor. Alternatively, the feedback signal could result from expiration of a timer initiated upon dispensing of a certain material. This form of feedback could be utilized where prior measurements established particular dispensing rates of the various materials. Preferably, when utilizing a PLC the feedback is in the form of an electronic input signal to the PLC. The signal can be generated by a weight sensor on a conveyor or pan receiving material which is dispensed from a bin by a metering motor. Upon receipt of such signal, the PLC would discontinue operation of the metering motor. For instance, a plurality of load cells could be placed under the receiving pan or conveyor so that as material was dispensed signals from the cells would be averaged and compared to an initial value by the PLC. That difference would represent the amount or weight of dispensed material. When the amount of dispensed material reached a predetermined value, the PLC would discontinue dispensing of that material.

Dispenser 1 finds wide application in agricultural feed mills, pharmaceutical and drug processing operations, general and light industrial operations for dispensing of various dry materials, food processing and formulating, and related industries. The preferred embodiment may contain only several bins or contain a large number of bins depending upon the size of the bins and available area of support surface 10. Thus, it is clearly envisioned that the preferred embodiment may contain from about 2 bins up to about 50 or more bins depending upon the desired application.

Although the preferred dispenser embodiment has been described for dispensing dry particulate materials, it is envisioned that the dispenser could be utilized for or readily adapted for dispensing semi-solid materials, semi-liquid materials, or liquid materials. Examples of semi-solid or semi-liquid materials include for example, slurries of suspended particles, emulsions containing various particulate materials, paste-like materials, and wet agglomerated quantities of ground material. Examples of liquid materials include high and low viscosity liquids, solutions and mixtures. In addition, it is envisioned that both dry mixing and wet mixing operations could also be performed in one or more bins, either before, during, or after dispensing of material in that bin.

Of course, it is understood that the foregoing is merely a preferred embodiment of the invention and that various changes and alterations can be made without departing from the spirit and broader aspects thereof as set forth in the appended claims, which are to be interpreted in accordance with the principles of patent law, including the Doctrine of Equivalents.

The embodiments of the invention in which an exclusive property or privilege is claimed are defined as follows:

1. A rotatable bin assembly for dispensing material, said assembly comprising:

a frame;

a support surface rotatably secured to said frame;

a plurality of bins secured to said support surface, wherein each bin is adapted for containing and dispensing said material;

an operable dispensing apparatus comprising a metering assembly disposed in at least one bin of said plurality of bins and a metering assembly activator for activating said metering assembly thereby dispensing material disposed in said at least one bin and a releasable coupler for releasably coupling said metering assembly and said metering assembly activator; and a rotator for selectively rotating said support surface;

whereby upon rotation of said support surface to a desired location by said rotator and operation of said dispensing apparatus, said material is dispensed from said bin at said desired location.

2. The rotatable bin assembly of claim 1, wherein said metering assembly activator comprises a metering motor which when coupled to said metering assembly by said releasable coupler and activated, causes material to be dispensed from said at least one bin.

3. A dry composition dispenser for dispensing powdered or granular materials, said dispenser comprising:

a frame;

a support surface rotatably secured to and generally positioned over said frame;

a plurality of bins secured to said support surface, wherein each bin is adapted for containing and dispensing a powdered or granular material;

a metering assembly associated with each said bin for dispensing material contained in said bin;

a rotator for selectively rotating said support surface;

a metering assembly activator for activating said metering assembly and thereby metering material contained in one of said plurality of bins; and a releasable coupler for releasably coupling said metering assembly with said metering assembly activator;

whereby upon rotation of said support surface one of said plurality of bins may be positioned proximate to said releasable coupler, and upon effecting coupling between said metering assembly of said one bin and said metering assembly activator, and activation of said metering assembly activator, said material contained in said one bin is dispensed.

4. A dry composition dispenser in accordance with claim 3 wherein said rotator for selectively rotating said support surface comprises:

a raceway disposed on said support surface;

a selector motor secured to said frame of said dispenser for providing a rotating output which may be selectively operated; and a drive wheel coupled to said output of said selector motor and contacting said raceway, whereby upon operation of said selector motor and rotation of said drive wheel, said support surface is rotated.

5. A dry composition dispenser in accordance with claim 4 wherein said raceway is disposed upon a circumferential wall extending along the perimeter of said support surface.

6. A dry composition dispenser in accordance with claim 4 wherein said selector motor is secured to said frame of said dispenser by a hinged member enabling movement of said drive wheel away from or toward said raceway.

7. A dry composition dispenser in accordance with claim 6 further comprising an air cylinder secured to said frame and having an arm with a first end extendably slidable within said cylinder and a second end secured to said motor, said cylinder and said arm extending between said frame and said motor, whereby upon introduction of pressurized air to said cylinder, said arm extends outward from said cylinder and positions said drive wheel in contact with said raceway.

8. A dry composition dispenser in accordance with claim 4 wherein said dispenser further comprises:

a signaling device which provides feedback to said selector motor indicating rotational position of said support surface, whereby operation of said selector motor is effected.

9. A dry composition dispenser in accordance with claim 3 wherein said each bin further comprises a bin bottom plate disposed in said bin providing an input port, said metering assembly comprises:

a base plate spaced from and disposed below said bin bottom plate by at least one circumferential guide wall disposed between said bin bottom plate and said base plate, said bin bottom plate, said base plate, and said at least one circumferential guide wall defining an impeller chamber;

a rotatable metering shaft extending at least partially into said impeller chamber; and a rotatable impeller residing in said impeller chamber and affixed to said metering shaft.

10. A dry composition dispenser in accordance with claim 9 wherein said metering shaft extends entirely through said impeller chamber and an end of said metering shaft is rotatably secured to an end bearing provided in said bin bottom plate.

11. A dry composition dispenser in accordance with claim 9 wherein said impeller contains a plurality of curved veins.

12. A dry composition dispenser in accordance with claim 3 wherein said plurality of bins is from about 2 to about 50.

13. A dry composition dispenser in accordance with claim 3 wherein said metering assembly activator comprises:

an actuator motor secured to said frame of said dispenser, said actuator motor providing a rotating output which may be selectively operated;

an actuator drive operated by said actuator motor; and a metering motor providing a rotating output which may be selectively operated, said metering motor secured to said actuator drive and positionably engageable with said metering assembly of said bin by said actuator drive;

whereby upon operation of said actuator motor, said actuator drive places said metering motor in position for engagement with said metering assembly.

14. A dry composition dispenser in accordance with claim 13 wherein said metering motor and said metering assembly are engaged with one another by said releasable coupler.

15. A dry composition dispenser in accordance with claim 14 wherein said releasable coupler comprises a pneumatically operated mechanical gripper comprising a plurality of moveable jaws for engagement with said metering assembly, said gripper secured to said rotating output of said metering motor.

16. A dry composition dispenser in accordance with claim 13 wherein said metering assembly activator further comprises:

a signalling device which provides feedback to said actuator motor indicating position of said actuator drive, whereby operation of said actuator motor may be effected.

17. A dry composition dispenser in accordance with claim 13 wherein said metering assembly activator further comprises:

a signalling device which provides feedback to said metering motor indicating amount of said material dispensed from said bin, whereby operation of said metering motor may be effected.

18. A dry composition dispenser in accordance with claim 3 wherein said releasable coupler comprises a pneumatically operated mechanical gripper.

19. A dry composition dispenser in accordance with claim 18 wherein said mechanical gripper is secured to a rotating output of said metering assembly activator, said gripper comprises a plurality of moveable jaws which may be placed in operable contact with said metering assembly upon introduction of pressurized air to said gripper.

20. A dry composition dispenser in accordance with claim 3 further comprising:

a programmable logic controller for controlling the operation of said dispenser.

21. A method for dispensing a powdered or granular material from a dispenser comprising a frame, a support surface rotatably secured to said frame, a rotator for selectively rotating said support surface, a plurality of bins secured to said support surface wherein at least one bin comprises said powdered or granular material and a metering assembly, and at least one metering assembly activator which may be selectively engaged with said metering assembly, said method comprising:

(a) rotating said support surface until said metering assembly of said bin comprising powdered or granular material to be dispensed is in position for engagement with said metering assembly activator;

(b) engaging said metering assembly of said bin comprising powdered or granular material to be dispensed with said metering assembly activator; and (c) activating said metering assembly activator to drive said metering assembly, whereby an amount of said powdered or granular material in said bin is dispensed therefrom.

22. A method in accordance with claim 21 wherein said rotating of said support surface is performed by a selector motor rotating a drive wheel which contacts a raceway provided on said support surface.

23. A method in accordance with claim 21 wherein said engaging of said metering assembly with said metering assembly activator comprises:

providing said metering assembly activator which comprises an actuator motor, an actuator drive operated by said actuator motor, and a metering motor which is positionably engageable with said metering assembly by said actuator drive; and moving said metering motor toward said metering assembly by operation of said actuator motor and said actuator drive until engagement with said metering assembly occurs.

24. A method in accordance with claim 21 wherein said method further comprises:

disengaging said metering assembly after a sufficient amount of powdered or granular material has been dispensed from said bin; and repeating steps (a)–(c).

25. A method in accordance with claim 24 wherein said plurality of bins comprises a first bin, a second bin and a third bin, and after a sufficient amount of material has been dispensed from said first bin, said method further comprises:

selecting one of said second bin and said third bin which is closest to said first bin prior to repeating said steps (a)–(c) for one of said second and said third bin.

26. A method in accordance with claim 24 wherein a plurality of different materials are dispensed.

27. A method in accordance with claim 26 wherein each material dispensed may be dispensed in varying amounts.

28. A method for dispensing at least two powdered or granular materials in predetermined amounts from a dispenser comprising a frame, a support surface rotatably secured to said frame, a rotator for selectively rotating said support surface, a first bin secured to said support surface and containing a first material to be dispensed, a second bin secured to said support surface and containing a second material to be dispensed, a metering assembly disposed in each of said first bin and said second bin, and at least one metering assembly activator which may be selectively engaged with each of said metering assemblies, said method comprising:

rotating said support surface until said metering assembly of said first bin containing said first material is in position for engagement with said metering assembly activator;

engaging said metering assembly of said bin containing said first material with said metering assembly activator;

activating said metering assembly activator to drive said metering assembly and dispense said first material from said first bin until a predetermined amount has been dispensed therefrom;

disengaging said metering assembly from said first bin;

rotating said support surface until said metering assembly of said second bin containing said second material is in position for engagement with said metering assembly activator;

engaging said metering assembly of said bin containing said second material with said metering assembly activator; and activating said metering assembly activator to drive said metering assembly and dispense said second material from said second bin until a predetermined amount has been dispensed therefrom.

\* \* \* \* \*